United States Patent [19]

Friedline et al.

[11] 3,940,835

[45] Mar. 2, 1976

[54] SLOTTING CUTTER AND CUTTING INSERT THEREFOR

[75] Inventors: Ernest J. Friedline, Latrobe; Robert N. Mitchell, Ligonier, both of Pa.

[73] Assignee: Kennametal Inc., Latrobe, Pa.

[22] Filed: May 19, 1975

[21] Appl. No.: 578,667

[52] U.S. Cl. ............................ 29/105 R; 29/95 R
[51] Int. Cl.[2] ...................... B26D 1/12; B26D 1/00
[58] Field of Search ............ 29/105 R, 105 A, 95 R, 29/96

[56] References Cited
UNITED STATES PATENTS

| | | | |
|---|---|---|---|
| 2,037,642 | 4/1936 | Scribner | 29/105 R |
| 3,116,538 | 1/1964 | Severson | 29/105 A |
| 3,754,309 | 8/1973 | Jones | 29/95 R |
| 3,757,397 | 9/1973 | Lindsay | 29/105 R |
| 3,821,837 | 7/1974 | Faber | 29/95 R |
| 3,887,975 | 6/1975 | Sorice et al. | 29/105 R |

*Primary Examiner*—Leonidas Vlachos
*Attorney, Agent, or Firm*—Melvin A. Crosby

[57] ABSTRACT

A slotting cutter in which a disc is provided with insert pockets on opposite sides thereof with replaceable cutting inserts of hard wear resistant material mounted in the pockets. The inserts are clamped in the pockets by a wedge which forces the inserts against the rearward and bottom walls of the pockets thereby providing extremely firm support for the inserts. When the disc is viewed in the circumferential direction, the inserts are in overlapping relation and thereby cooperate to cut slots in a work member.

10 Claims, 12 Drawing Figures

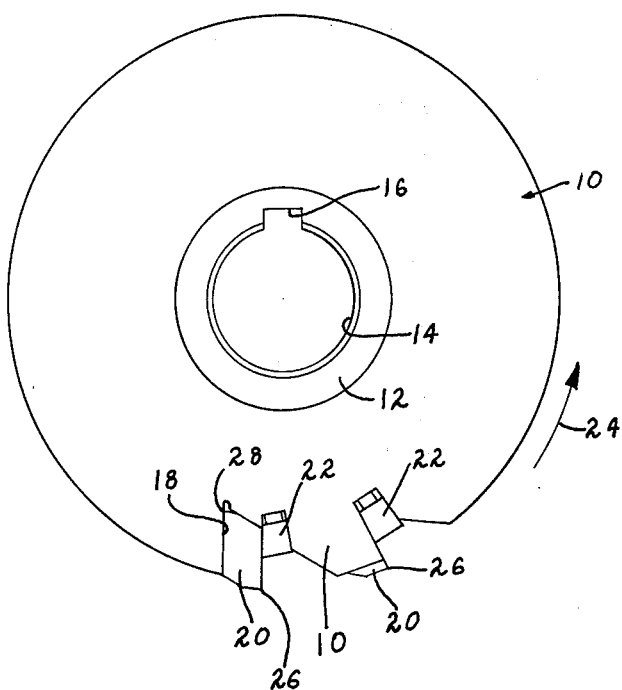
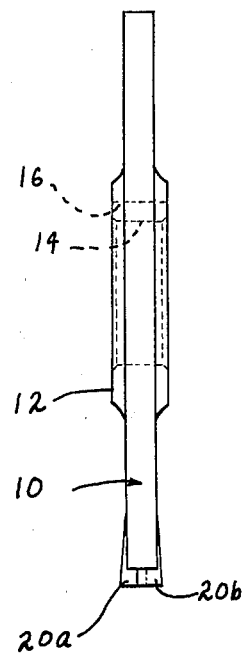
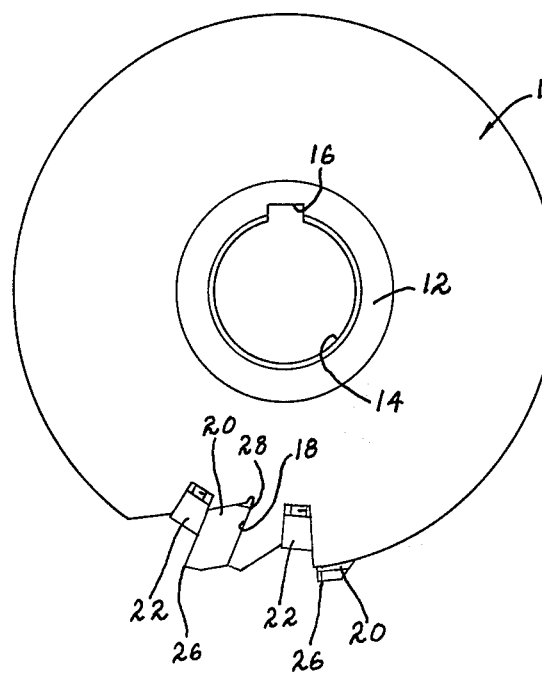
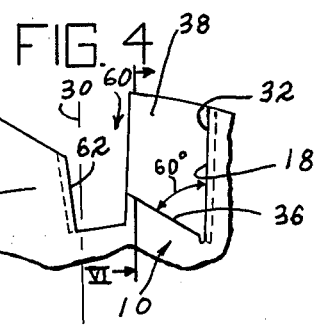
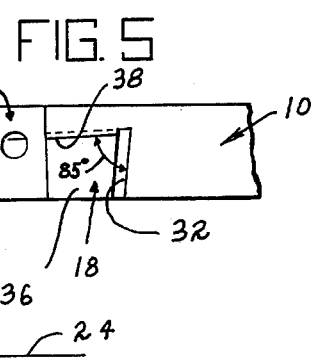

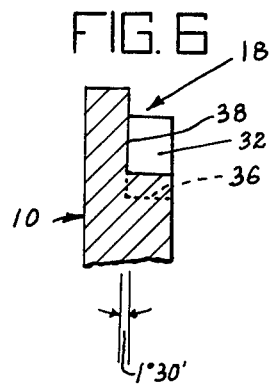
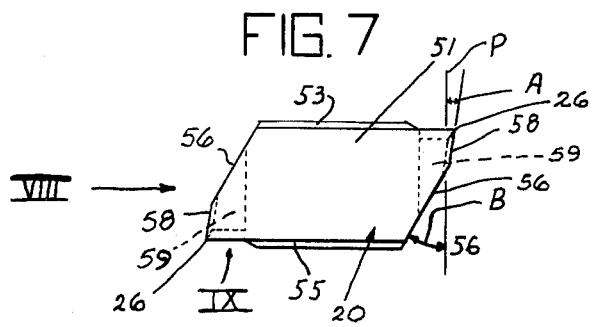
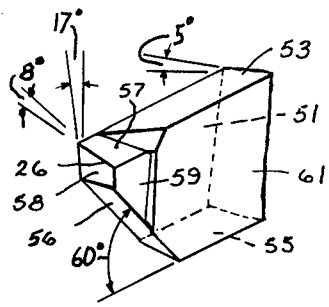
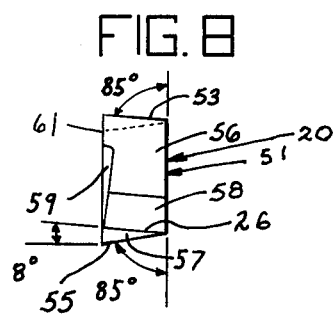
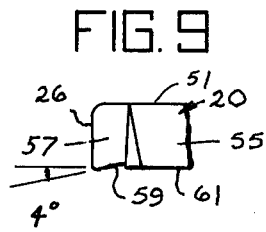
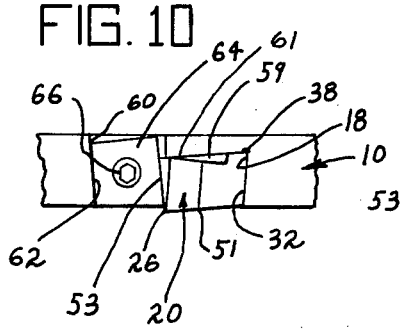
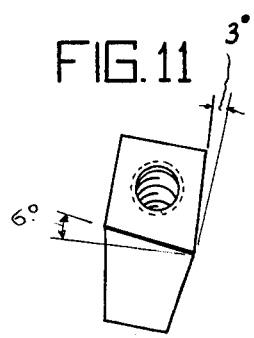

SLOTTING CUTTER AND CUTTING INSERT THEREFOR

RELATED APPLICATION

United States Patent application Ser. No. 469,516, filed May 13, 1974, entitled "SLOTTING CUTTER AND CUTTING INSERT THEREFOR," Inventors Edward L. Sorice and Ernest J. Friedline.

The present invention relates to slotting cutters and is particularly concerned with a slotting cutter of novel design which can be formed to cut relatively narrow as well as relatively wide slots.

Slotting cutters are known for cutting keyways and the like and, also, for providing work members with slots of various width.

Slotting cutters of the nature referred to are somewhat similar to milling cutters in that the cutter usually employs a disc-like member having cutting inserts mounted in the periphery thereof. In a milling cutter, the cutting inserts are generally presented axially, whereas, in a slotting cutter, the cutting inserts protrude radially from the supporting disc and are, thus, presented to the work in the radial direction.

In order to form slots rapidly and efficiently, it is essential that the cutting inserts be solidly supported in the support disc. With the inserts solidly supported, the slotting cutter is able to withstand substantial loads and can cut extremely rapidly and accurately.

BRIEF SUMMARY OF THE INVENTION

According to the present invention, a slotting cutter is formed by forming pockets in the sides of a supporting disc at the periphery thereof in circumferentially distributed relation with some of the pockets being formed in one side of the disc and others being formed in the opposite side of the disc. Cutting inserts are mounted in the pockets and protrude radially therefrom and wedges carried by the disc are operable for clamping the inserts firmly in the pockets in load transmitting relation to the trailing and radially inward walls of the pockets.

Each pocket extends only part-way through the support disc in the axial direction and, thus, has only two open sides so that an insert disposed in a pocket is extremely solidly supported therein and on the trailing side bears directly on the material of the support disc whereby the support for the insert is extremely solid and capable of sustaining relatively high loads.

With the foregoing in mind, a primary object of the present invention is the provision of a slotting cutter of improved design.

Another object is the provision of a cutting insert for detachably mounting in the slotting cutter and especially adapted for use therewith.

The exact nature of the present invention will become more apparent upon reference to the following detailed specification taken in connection with the accompanying drawings in which:

FIG. 1 is a view looking in at one side of a slotting cutter according to the present invention.

FIG. 2 is a view looking in at the edge of a slotting cutter of FIG. 1.

FIG. 3 is a view looking in at the side of the slotting cutter opposite the FIG. 1 side thereof.

FIG. 4 is a side view of a portion of the support disc of the slotting cutter drawn at enlarged scale and showing more or less in detail the configuration of an insert receiving pocket therein.

FIG. 5 is a plan view looking down on the pocket radially.

FIG. 6 is a sectional view indicated by line VI—VI on FIG. 4.

FIG. 7 is a side view of the cutting insert adapted for being received in the pocket of FIG. 4 and looking at the cutting insert from the side which faces axially outwardly of the pocket when the insert is mounted therein.

FIG. 8 is an end view looking in at the left end of the insert of FIG. 7 as indicated by arrow VIII on FIG. 7.

FIG. 9 is a view looking up at the bottom of the insert of FIG. 7 as indicated by arrow IX on FIG. 7.

FIG. 10 is a view looking in at the edge of the disc showing an insert clamped in a pocket.

FIG. 11 is a perspective view of a clamping wedge.

FIG. 12 is a perspective view of a typical cutting edge on an insert.

DETAILED DESCRIPTION OF THE INVENTION:

Referring to the drawings somewhat more in detail, the slotting cutter according to the present invention comprises a support disc 10 having a central hub region 12 which is provided with a bore 14 for receiving a support shaft and with a keyway 16 for receiving a drive key. Slotting cutter 10 is provided with a plurality of cutting insert receiving pockets 18 on each axial face of the insert.

The pockets are distributed circumferentially about each face of the insert, and the pockets in one face of the insert are staggered relative to the pockets in the other face of the insert. The staggering of the pockets will plainly be seen in FIGS. 1 and 3. Replaceably mounted in each pocket is a cutting insert 20 fixed in place by a wedge 22.

The slotting cutter of FIGS. 1 to 3 rotates in the direction of the arrow 24 and each of the cutting inserts 20 is provided with a cutting edge 26 on the leading side of the radially outer end and the cutting edge 28 on the trailing side of the radially inner end. Each insert, thus, has two cutting edges and these cutting edges can be selectively presented to working position by loosening an insert and indexing the insert about an axial axis and then again clamping the insert in the support disc.

Turning to FIGS. 4 to 6, each pocket 18 will be seen to comprise a rearward wall parallel to a radius spaced forwardly from the pocket on the leading side thereof. For example, in FIG. 4, a radius of the support disc 10 is indicated at 30 and the rearward wall of the pocket 18 illustrated therein is indicated at 32.

The radially inner wall of pocket 18, indicated at 36, is inclined at an angle to rearward wall 32 so as to converge with radius 30 in the radially outward direction. The direction of rotation of the support disc in FIG. 4 is again indicated by arrow 24.

Turning to FIG. 5, it will be noted that pocket 18 has an axially bottom wall 38 extending forwardly from rearward wall 32 and forming an acute included angle therewith. It will, also, be noted in FIG. 5 that the pocket 18 is formed into support disc 10 so that the axially bottom wall 38 thereof diverges from the central plane of disc 10 in the rearward direction, namely, so that the leading radial corner of the insert on the axially outer side is spaced farther outwardly from the disc than the trailing radial corner on the axially outer side.

In this manner, side clearance is provided for the insert. It will be understood that the pockets on opposite sides of the disc are inclined in respectively opposite directions so that the leading radially outer corner of each insert on the axially outer side projects outwardly from the support disc 10.

Reference to FIG. 6 will, furthermore, show that the axially bottom wall 38 of eack pocket is inclined to the radial direction of support disc 10 so that the radially outermost region of the pocket is more shallow than the radially innermost region thereof whereby each insert is inclined outwardly toward the open side of the respective pocket so that the radially outer end is farthest away from the support disc.

The incline of the inserts in the support disc in the radial direction will be observed in FIG. 2 which shows an insert 20a at the bottom of the disc inclined outwardly toward one side and a second insert 20b also at the bottom of the disc and inclined outwardly in the opposite direction.

FIGS. 7, 8, 9 and 12 each show a typical insert adapted for mounting in a pocket of the support disc 10. The insert 20 of FIG. 7 shows at the front of the view that side 51 of the insert which faces away from the axially bottom wall 38 of the respective pocket while side 61 that faces the axially bottom wall 38 of the pocket is on the back of the view. The insert is generally a parallelogram when viewed from the side, as in FIG. 7.

Each end of the insert has a first wall portion 56 inclined at angle B, say, 30°, to a plane P perpendicular to the longitudinal axis of the insert, and a second wall portion 58 which forms an obtuse angle with the aforementioned portion 56 and is at a smaller angle A, say, 17°, to the aforementioned plane.

As will be seen in FIGS. 7, 8, 10 and 12, the insert has two longitudinal walls 53 and 55 which converge toward side 51 of the insert at an included angle of, say, 10° therebetween. Each end of the insert, in addition to the aforementioned angular portions 56 and 58 which are formed thereon, has a surface area 57 facing toward the leading side of the insert and formed to any desired angle, say, at 8° to the horizontal, when the insert is viewed in the direction of arrow 8 to provide for predetermined cutting conditions at cutting edge 26 of the insert. Thus, there can be positive rake conditions or negative rake conditions as may be desired along cutting edge 26 depending on the type of work to be done.

When the insert is mounted in the pocket, as shown in FIG. 10, that side 51 of the insert which faces in the outward direction will be seen to incline inwardly toward the holder disc 10 in a direction rearwardly from cutting edge 26. This position of the insert in the pocket provides for the necessary side clearance toward the axially outer side of the holder disc.

On the other side of the insert, and commencing from the other end of cutting edge 26, there is a relieved region 59 which provides for clearance between the insert and the workpiece toward the axially inner side of the insert. Region 59 is inclined inwardly rearwardly from the cutting edge at an angle of about 49 from the plane of the adjacent side wall of the insert and in the downward direction inclines inwardly at about 5 degrees to the said plane. As will be seen in FIG. 7, the relieved region 59 extends completely across the insert from top to bottom, as the insert is viewed in FIG. 7, so that clearance is provided on both sides of the insert rearwardly of the cutting edge 26.

The manner in which the insert is clamped in the respective pocket in disc 10 will become apparent from FIGS. 10 and 11. In FIG. 10, the insert will be seen to be in abutting engagement with rearward wall 32 of the respective pocket 18 and also in abutting engagement with axially inner wall 38 of the pocket. At the front side of the pocket, the disc is provided with a transverse radially outwardly opening notch 60 which is generally parallel with that side with wall 53 of the insert which faces away from rearward wall 32 of the pocket.

The side 62 of notch 60 opposed to side 53 of the insert converges therewith in the radially inward direction, and for this reason, wedge member 64 can be pulled down in notch 60 as by a screw 66 having a thread on one hand engaging a hole in the wedge member and a thread of the opposite hand engaging a hole in the bottom of notch 60.

It will be appreciated that the longitudinal walls 53, 55 of the insert converge in a direction axially outwardly from pocket 18 so that when the wedge is tightened up in its notch 60, insert 20 in the pocket will be firmly clamped therein and firmly held against rearward wall 32, axially inner wall 38 and radially inner wall 36.

Modifications may be made within the scope of the appended claims.

What is claimed is:

1. In a slotting cutter; a disc-like body rotatable in a predetermined direction on a central axis perpendicular to the plane of the body, a plurality of pockets formed into each side of the body in circumferentially distributed relation with the pockets in the opposite sides of the body staggered relative to each other, each pocket having a rear wall inclined forwardly in the radially outward direction and an axially bottom wall inclined axially outwardly in the forward direction and a radially inner wall inclining radially outwardly in the forward direction, each said pocket being open on the axially outer side and at the radially outer end and on the forward side, a cutting insert in each pocket having forward and rearward and end walls and parallel side walls and cutting edges on the opposite ends, each insert having an end portion protruding radially from said body when mounted in a said pocket and presenting a said cutting edge on the forward side of the radially outer end, a lateral notch in said body at the forward side of each pocket having a rearwardly facing forward wall which converges with said rear wall of the respective pocket in the radially inward direction, and a clamping wedge in each notch between said forward wall of the notch and the opposed side of said insert for clamping each insert in the respective pocket while simultaneously urging the insert toward the said rear wall and the said radially inner wall of the pocket.

2. A slotting cutter according to claim 1 in which each said axially bottom wall inclines outwardly in the radially outer direction.

3. A slotting cutter according to claim 1 which includes threaded means extending radially in each wedge and in said body beneath the wedge for drawing the clamping wedge downwardly in the respective notch to clamp the adjacent insert in the respective pocket.

4. A slotting cutter according to claim 1 in which said front wall of said notch converges with the rear wall of the respective pocket in the direction toward the open side of the pocket.

5. A slotting cutter according to claim 4 in which said forward and rearward walls of the insert converge in the direction toward the open side of the pocket.

6. A slotting cutter according to claim 1 in which the said cutting edges on each insert are located at the juncture of the end walls of the insert with respective ones of the top and bottom walls of the insert whereby each insert is invertable about an axis substantially parallel to the axis of rotation of the said body and in each position will present a said cutting edge on the forward side of the radially outer end thereof.

7. A slotting cutter according to claim 1 in which the pockets on one side of the wheel axially overlap the pockets in the other side of the wheel.

8. A cutting insert, especially for a slotting cutter; comprising a body of hard wear resistant material having forward and rearward walls and parallel side walls, said insert having end regions each forming a cutting edge near the plane of a respective one of said forward and rearward walls, each end region having a first portion near the respective one of said forward and rearward walls making a first larger included angle with the plane thereof and a second portion remote from said plane and making a second smaller included angle therewith, and each of said forward and rearward walls being inclined the same angle toward the other thereof in a direction toward one side wall of the insert.

9. A cutting insert according to claim 8 in which the other side of each end portion is relieved rearwardly of said cutting edge to provide clearance rearwardly from the respective cutting edge.

10. A cutting insert according to claim 9 in which each cutting edge is formed at the juncture of the said first portion of the respective end wall with the respective one of said top and bottom walls, the respective one of said top and bottom walls being formed to an inclination rearwardly from the cutting edge which is opposite to the direction of inclination of the said wall.

* * * * *